United States Patent [19]
Kearns et al.

[11] 3,753,144
[45] Aug. 14, 1973

[54] GAS LASER STRUCTURE

[76] Inventors: William J. Kearns, 400 N. Old Ranch Rd.; Andrew O. Jensen, 2134 Canyon Rd., both of Arcadia, Calif.

[22] Filed: Oct. 18, 1971

[21] Appl. No.: 190,301

Related U.S. Application Data
[60] Division of Ser. No. 4,178, Jan. 14, 1970, abandoned, which is a continuation of Ser. No. 503,232, Oct. 13, 1965, abandoned.

[52] U.S. Cl. .................... 331/94.5 O, 331/94.5 D
[51] Int. Cl. ............................................. H01s 3/00
[58] Field of Search ............................... 331/94.5

[56] References Cited
UNITED STATES PATENTS

| | | | |
|---|---|---|---|
| 3,427,564 | 2/1969 | Okaya et al. | 331/94.5 |
| 3,243,715 | 3/1966 | Welton | 330/4.3 |
| 3,531,734 | 9/1970 | Gordon et al. | 331/94.5 |

Primary Examiner—Edward S. Bauer
Attorney—James J. Ralabate, Irving Keschner et al.

[57] ABSTRACT

This application relates to a gas laser structure having an insulating, heat resistant discharge tube having means associated therewith for transferring heat therefrom during lasing operation. In a first embodiment, cooling fins are attached to the outer surface of the discharge tube. In further embodiments, the fins extend through the outer discharge tube wall and are either formed to provide, among the plurality of fins, an inner discharge tube or are connected to substantially cylindrical discharge tube sections. In still a further embodiment, a boiler-condenser——vapor cooling technique structure is disclosed. Means to equalize the pressure between the opposite ends of the laser structure is also disclosed.

3 Claims, 5 Drawing Figures

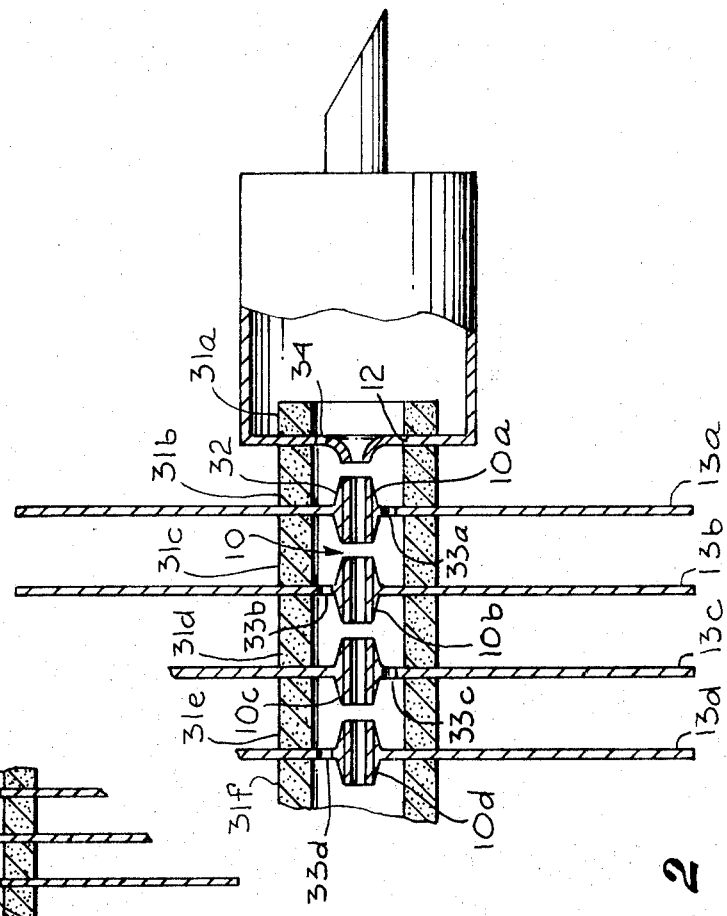

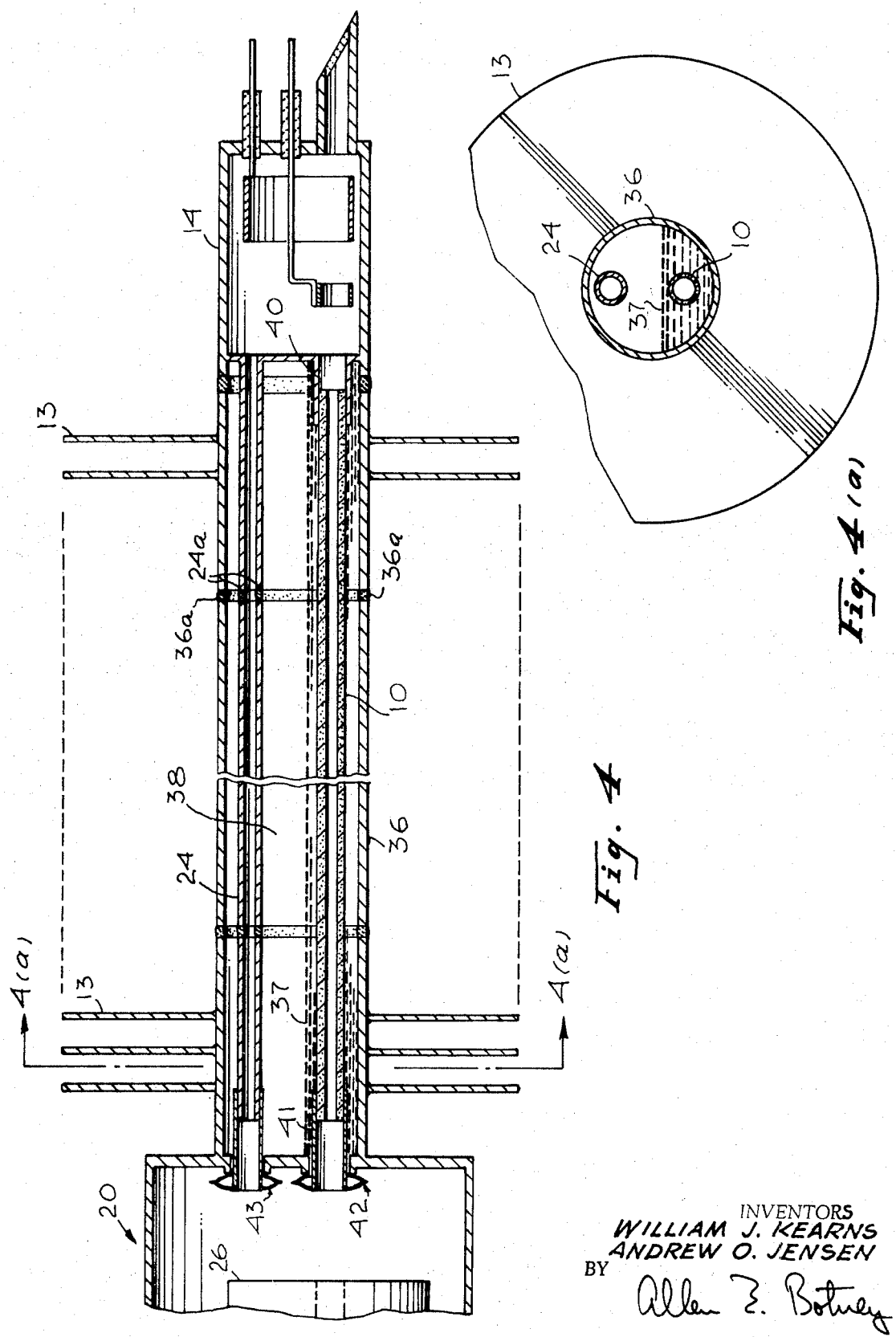

GAS LASER STRUCTURE

This is a division, of application Ser. No. 4,178, filed Jan. 14, 1970, and now abandoned which in turn is a continuation of application Ser. No. 503,232, filed Oct. 13, 1965., and now abandoned The present invention relates to the gas discharge art in general and more particularly relates to a novel structural arrangement for the cooling of high-power ionized gas lasers.

Heat dissipation has been a major problem source in the laser field, especially in connection with the high-powered ionized gas type of laser. More specifically, the relatively high temperatures normally generated during the operation of such a laser oftentimes leads to a contamination of the gas used, either because of a chemical decomposition of the surface mater-ials or because of the process known as "outgassing." Chemical decomposition is the effect produced under the influence of the energy of the bombarding ions and the thermal energy of the discharge itself, and outgassing, as the term implies, is the outpouring of gases contained or lodged in the walls of the structure that are freed under the influence of the heat generated. Accordingly, it is essential that some effective means be provided to conduct the heat away, not only to avoid thermal breakage and, therefore, permanent damage to and loss of this expensive equipment, but also to avoid a possible deterioration of the operation itself. However, to date, the problem has not been satisfactorily resolved.

It is, therefore, an object of the present invention to provide means for extending the useful life of high-power ionized gas lasers.

It is another object of the present invention to provide a high-power ionized gas laser structure that can withstand high operating temperatures for long periods of time.

It is still another object of the present invention to provide a structure that can withstand rigid thermal cycling encountered in normal operation of starting and stopping the discharge.

It is a further object of the invention to provide a uniformly distributed gas return path to the discharge area to mitigate gas pumping problems in the arc channel and thereby increase the power output potential of the channel without resorting to higher input powers or magnetic fields.

It is an additional object of the present invention to provide a high-power ionized gas laser structure that facilitates the carrying away of the heat dissipated during its operation.

It is a further object of the present invention to provide means for substantially reducing the contamination of laser gases during the operation of the laser.

It is still another object of the present invention to provide means for substantially improving the heat transfer properties of high-power ionized gas lasers.

The present invention overcomes the above-mentioned limitations, deficiencies and difficulties that are encountered among ionized gas lasers in the prior art and achieves the stated objects of the invention by providing a laser structure that is primarily constructed of metal and ceramic materials, with the metal and ceramic parts being shaped and interconnected or engaged with one another in such a manner that the heat generated is efficiently carried away and dissipated without adversely affecting the laser. More particularly, in embodiments of the present invention, a rare gas that is capable of lasing, such as argon, xenon, krypton, helium and neon, or a mixture of them, is sealed in a tube made almost entirely of metal and ceramic or metal and glass materials. An anode and a cathode are mounted within and form a part of the tube envelope at opposite ends thereof, and the space between them is choked by a long capillary-type discharge tube. When a discharge of the gas is excited between the anode and cathode, the electron currents are forced to go through the discharge tube, thereby significantly increasing the current density. This high current density, in turn, creates a plasma wherever excitation and ionization of the gas has taken place and it does so with a high degree of efficiency. As a result of this high degree of ionization of the gas, atoms therein are excited to an upper laser state which later make the transition to a lower laser level to generate the laser beam. As is well known, the laser oscillation is excited either between internal or external mirrors that form an optical resonator.

In some embodiments of the invention, the discharge tube, in order to accomodate high-temperature plasma, is made of a ceramic material and is supported at its ends by being inserted into ferrule-type metal elements that are, in turn, respectively connected both mechanically and electrically to the cathode and anode portions of the laser. The outside surface of the discharge tube is then placed in contact with a plurality of metal fins by means of which the heat energy is carried away from the tube. In other embodiments of the invention, the ceramic discharge tube is replaced with one of metal, the metal fins, themselves being shaped, for efficient cooling purposes, to provide the essential sections of the discharge tube. In still other embodiments, the ceramic discharge tube is enclosed in a boiler-condenser member wherein a vapor cooling technique is employed. However, if deemed desirable, metal fins for heat transfer purposes may also be used here, but in this case the fins are mounted on the boiler-condenser member rather than on the discharge tube. In all embodiments, the anode and cathode sections are substantially fabricated as metal cylinders and are mounted as a part of the envelope structure, the heat generated in these sections being efficiently carried away by the cooling means provided.

The advantages of a laser structure according to the present invention are manyfold, some of the more important ones being as follows:

1. Contamination of the gas and the deteriorating effects thereof is significantly reduced;

2. The lifetime limit of an ionized gas laser is extended many orders of magnitude;

3. The overall structure, due to the relatively fragile glass and quartz parts previously employed, is considerably stronger;

4. The direct connection of metal parts to the ends of a ceramic discharge tube of uniform diameter keeps the stress in the ceramic tube at a minimum, thereby avoiding breakage of the ceramic tube at high-temperatures and under thermal cycling conditions; and 5. An air-cooled laser system that includes metal cooling fins mounted on its ceramic disharge tube eliminates the need for more complicated cooling apparatus, which makes such a system much more portable.

The novel features which are believed to be characteristic of the invention, both as to its organization and method of operation together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIG. 2 is a cross-sectional view of only a portion of a laser and illustrates a metal discharge tube fabricated in sections, the metal fins respectively being mounted on these sections, and the whole enclosed and supported by a ceramic envelope;

FIG. 3 is a cross-sectional view of a modification of the FIG. 2 embodiment in which the metal fins themselves are constructed to respectively include the sections of the discharge tube;

FIG. 4 illustrates, in cross-section, another embodiment of the invention in which a vapor cooling technique is employed; and FIG. 4($a$) is a cross-sectional view of the FIG. 4 embodiment taken along the broken line A—A and in the direction of the arrows thereof.

Figure 1:
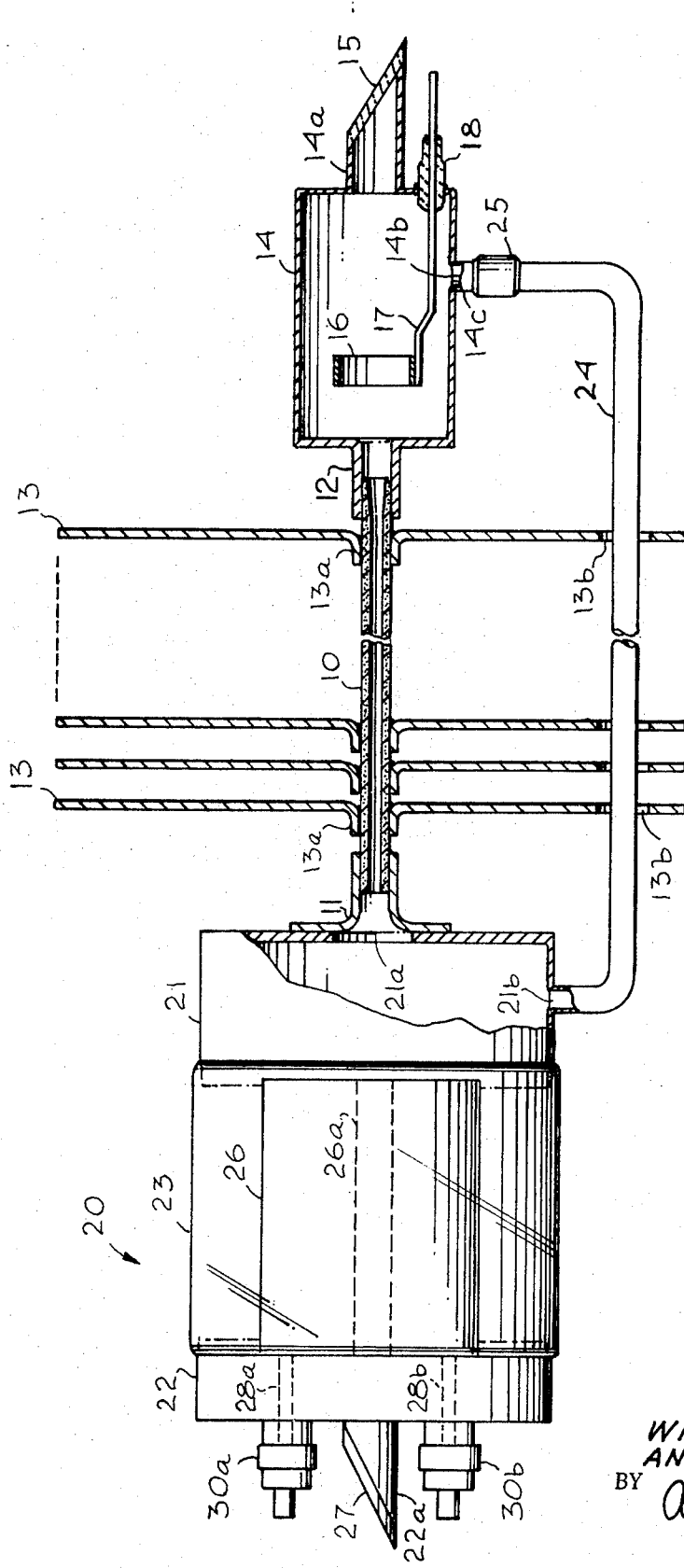
FIG. 1 illustrates, in cross-section, a first embodiment of the invention in which a plurality of metal cooling fins are mounted on a ceramic discharge tube positioned between the anode and cathode portions of the laser.

For a consideration of the invention in detail, reference is now made to the drawings wherein like or similar parts or elements are given like or similar designations throughout the several figures. In FIG. 1, the embodiment therein is shown to include an elongated and cylindrically shaped discharge tube 10 made of a highly heat-resistant material such as a ceramic material, alumina ($Al_2O_3$), magnesia (MgO), berrylium oxide (BeO), boron nitride (BN), and zirconia ($ZrO_2$) being a few examples of ceramic materials that may be used herein. As shown in the figure, discharge tube 10 is mounted on a pair of metal end ferrules 11 and 12 that are respectively fitted over and hermetically sealed to the ends of the discharge tube. Any appropriate sealing material and technique may be used toward this end. In order to provide an air-cooled heat dissipation system, a plurality of metal fins 13 are used by means of which cooling takes place by either natural air convection or forced air flow. More specifically, the metal fins are mounted in an upright position on discharge tube 10, preferably parallel to each other, the mounting of the fins being effected by brazing them to the ceramic wall which has been properly metallized for this purpose. Brazing is utilized to prevent the formation of an interface which would cause poor heat transfer and localized hot spots which in turn might cause ceramic fracture due to thermal stresses. While any one of a number of different thin configurations may be utilized, the one shown in FIG. 1 is circular or disc-shaped and has an opening at its center through which the discharge tube extends. For the purpose of providing good surface contact with the tube, the edge of the opening in each fin is bent at substantially right angles to the fin to provide a sort of bushing 13$a$. Brazing is effected between the surfaces of the discharge tube 10 and these bushings 13$a$. The fins and braze metal must be chosen for compatability with the ceramic regarding thermal expansion, thermal conductivity and alloying. Typical materials that may be used are copper or stainless steel fins brazed with copper-gold, copper-silver, or copper braze material. As previously indicated, a great deal of heat is generated in the discharge tube during the operation of the laser and this heat is transferred to the fins and they, in turn, transfer the heat to the surrounding air which rises, the cooler air then flowing in to take its place. Hence, during the operation of the laser, convection currents are set up that effectively limit the rise in temperature to an acceptable extent. However, forced air may also be used to increase the heat-handling capacity. One final feature of the fins should be mentioned, namely, that between the center and outer edge of each fin it preferably includes an aperture 13$b$, the apertures through all the fins being aligned or in registration with one another to form a sort of channel or passageway. The reasons for apertures 13b will be explained below and, therefore, more fully understood later.

Also included in the FIG. 1 embodiment is a hollow metal cylinder 14, preferably of stainless steel, which, in the concept of the current invention, constitutes an external anode. More specifically, the base of ferrule 12 is welded to one end of anode 14 and thereby constitutes an end wall of the anode, with the result that discharge tube 10 opens into or links with the chamber formed by the anode and the ferrule. At the other end of the anode, that is to say, in the wall opposite the ferrule, there is mounted a Brewster window 15 that is positioned to be axially aligned with the discharge tube. While the anode structure may be designed in a number of ways to hold the Brewster window, one way is shown in the figure and involves providing a metal extension 14$a$ that protrudes from the far wall of the anode and cut at the desired Brewster angle. As shown, the Brewster window is mounted at the end of this protruding section of the anode and a glass-metal seal is provided therebetween to hermetically enclose it. Mounted within the chamber of anode 14 and axially aligned with the discharge tube is a ring-shaped starting electrode 16 to which is connected and which is supported by a high-voltage feed thru 17 which is electrically insulated from the wall of the anode by means of an insulator element 18 that may, for example, be a Kovar-glass type of insulator. Finally, in its lateral wall, anode 14 has an opening therethrough designated 14$b$, a lip 14$c$ extending outwardly or externally from this opening to which connections can be made as will be seen below.

Just as an anode is mounted to one end of the discharge tube assembly, a hollow cylindrically shaped cathode structure, generally designated 20, is mounted on the other end of this assembly and while, like the anode, this cathode structure may be made entirely out of stainless steel, it is shown instead to be fabricated out of three members, namely, a pair of metal cylinder sections 21 and 22 and a glass cylinder section 23 therebetween, the aforesaid three sections being hermetically sealed to each other by means of a glass-metal seal to form a unitized cathode structure. In the front wall of metal section 21, the cathode structure includes an opening 21$a$ by means of which discharge tube 10 is able to link with or open into the chamber formed within the cathode structure. Accordingly, the base portion of ferrule 11 is mounted over opening 21$a$ in such a manner that the discharge tube is axially aligned not only with the opening but with the entire cathode structure. The ferrule is fixedly mounted in position over the opening by welding it to the surrounding wall. In the lateral surface of metal section 21 is another opening 21b and it is between this opening 21b and earlier-mentioned opening 14b that a pressure-equalizing metal tube 24 is connected, the tube 24 extending through fin openings 13b in order to provide as short a path for it as is practical. It should also be noted at this point that tube 24 is linked or coupled to lip 14c at the anode by means of an insulator section 25 therebetween, Kovar-glass being one material, ceramic another, that may be utilized for insulator section 25.

As may be expected, a cathode 26 is mounted in structure 20, cathode 26 also being of a cylindrical configuration with an opening 26a running centrally through it for its full length. Cathode 26 is mounted so that its opening 26a is axially aligned with opening 21a and discharge tube 10, and a cathode that may be adapted for use herein is disclosed in U.S. Pat. No. 1,985,855, issued on Dec. 25, 1934 to D. V. Edwards, et al.

As in the case of the anode, a Brewster window 27 is also mounted in the far end wall of the cathode structure and, as before, the window is positioned to be axially aligned with the discharge tube. Here again, a metal extension 22a that protrudes from the wall of metal cylinder section 22 and cut at the desired angle is provided for the Brewster window which is mounted at the end of this protruding section, a glass-metal seal being provided therebetween to hermetically enclose it. Finally, a pair of terminals 28a and 28b feed through the wall of section 22 to cathode 26, the terminals respectively being insulated from the wall by means of insulators 30a and 30b.

As previously mentioned, the laser structure is filled with a gas capable of being excited to a lasing state.

Considering now the elements of its operation, when a gas discharge from the cathode to the anode is initiated, it is forced to flow through the narrow channel of discharge tube 10, thereby significantly increasing the current density of the discharge. This high current density, in turn, creates a high degree of ionization and excitation of the gas. As a result, atoms are exicted to an upper laser state and when they then make the transition to a lower laser level, a laser beam is produced that is confined and enhanced by the optical resonator formed by mirrors mounted at opposite ends of the laser. The use of such mirrors for this purpose is a common practice and, therefore, a showing of these mirrors is not deemed necessary here especially since they are not considered to be a part of the invention. Suffice it to say that a considerable amount of heat is generated in the discharge tube which is transferred to the metal fins which, in turn, transfer the heat to the surrounding air which rises, the cooler air then flowing in to take its place. Hence, during the operation of the laser, convection currents are set up that effectively limit the rise in temperature to an acceptable extent. Another embodiment of the invention is illustrated in FIG. 2 to which reference is now made. However, since the anode and cathode portions of this second embodiment are substantially the same as in the FIG. 1 embodiment, only the discharge tube apparatus therebetween is shown with the necessary detail. Furthermore, because the discharge tube apparatus is made up of a plurality of smaller identical sections, only a few of them are included in the figure to avoid being unnecessarily repetitive.

In this embodiment, the laser structure is provided with an outer cylindrically shaped tube, generally designated 31, and a discharge tube, generally designated 10, that is mounted inside this outer tube and concentrically therewith. However, as previously noted, both the outer tube and the discharge tube are divided into sections, those of the discharge tube respectively being designated 10a–10c and those of the outer tube respectively being designated 31a–31f. For convenience, the several metal fins shown in the figure are likewise respectively designated 13a–13d. As shown, outer tube sections 31b–31f are positioned so as to be spaced from each other, the spacing between each adjacent pair of these sections being equal to the width of a metal fin. Stated differently, metal fins 13a–13d are respectively mounted on discharge tube sections 10a–10d and, therefore, in order to reach sections 10a–10d, the fins extend between these outer tube sections 31b–31f. Thus, for example, fin 13a extends between outer tube sections 31b and 31c to discharge tube section 10a, fin 13b extends between outer tube sections 31c and 31d to discharge tube section 10b, etc. Since a gas under low pressure is required to be contained within the walls of the laser structure, outer tube sections 31b–31f are therefore hermetically sealed to fins 13a–13d and this may be accomplished in any suitable way. Furthermore, in order to provide good heat conductor qualities, metal fillets, such as fillet 32, are preferably provided at the junctions of the discharge tube sections and the fins, thereby securing a good bond and good surface contact between them.

It will thus be recognized from what has been said that the outer tube sections and the fins combine to form a plurality of separate and distinct cylindrically shaped chambers of which the outer tube sections form the outer walls and the fins form the flat end walls, the abovesaid chambers being linked or coupled one to the other by means of the discharge tube sections which extend through the fins. These chambers are, however, linked or coupled in still another manner. More specifically, in order to provide some method for equalizing the gas pressure, the fins are respectively provided with openings 33a–33d through them that are preferably staggered in their location in order to provide a high impedance discharge path as compared to that through the discharge tube. Thus, as shown in the figure, apertures 33a and 33c are located on one side of the discharge tube sections whereas apertures 33b and 33d are located on the other side of them. Ferrule 12 also includes an aperture 34 through it by means of which this pressure-equalizing channel ultimately couples to the hollow or chamber of anode 14 and, on the other side of the laser, ferrule 11 likewise includes an opening through it for the same reason, namely, to couple the pressure-equalizing channel to the cathode. One final point should be made, namely, that outer tube 31 may also include a section 31a mounted inside the anode chamber on the surface of ferrule 12. However, while this adds symmetry and some strength to the construction, such a section 31a is not essential.

The operation of this FIG. 2 embodiment is basically the same as the FIG. 1 embodiment. Suffice it to say, therefore, that the gas discharge occurs through discharge tube sections 10a–10d, any differences in pressure being equalized by means of apertures 33a–33d and 34 through which the gas passes from the higher pressure to the lower pressure region. As before, the large amount of heat generated is transferred to the fins and thereafter to the air.

The FIG. 2 embodiment may be modified in the manner shown in FIG. 3 in which the metal fins themselves are constructed to include the sections of the discharge tube. More specifically, as shown in the figure, the center portions of the fins are all turned outwardly in one direction, in this case in the direction of the cathode, to provide bushing-type protrusions that take the place of discharge tube sections 10a–10d in FIG. 2. Thus, in this arrangement, the fins and the discharge tube are fabricated together as a unit. The rest of the structure is the same and, therefore, no further descriptive detail is offered in order to avoid being unnecessarily redundant. However, it was previously mentioned that ferrule 11 also includes a pressure-equalizing aperture through it and, therefore, attention is directed to this aperture at this time which is designated 35 in FIG. 3.

Metal fins for laser cooling purposes may be combined with other types of cooling arrangements as is illustrated in FIGS. 4 and 4(a) wherein the advantages of metal fins are combined with those of a boiler-condenser apparatus in which a vapor-cooling technique is employed. As shown in the figures, a laser cooled in this manner includes a boiler-condenser member 36 which is basically a hollow tube, preferably made of metal for heat conductivity purposes, through which ceramic discharge tube 10 extends and in which a high heat-capacity liquid 37 is contained in which the discharge tube is immersed. As indicated in the figures, liquid 37 only partially fills member 36, that is to say, only enough to cover the discharge tube and may, for example, be mercury, or one of the alkali metals, such as sodium or potassium, or one of the organic heat-transfer fluids, such as the silicones or ethylene glycol (anti-freeze). Needless to say, water may also be used as the coolant fluid. In short, discharge tube 10 passes through liquid 37 which lies at the bottom portion of member 36, the upper portion of the member, namely, that part of the member that is above the fluid, being filled with the vapor, designated 38, from the liquid. For reasons that will subsequently appear, the bottom or liquid portion of this arrangement is termed the boiler and the upper or vapor portion thereof is termed the condenser. Passing through the aforesaid condenser is a pressure-equalizing or gas-return tube 24, preferably made of metal, and, finally, extending in an upright position along member 36 in spaced and parallel relationship are a plurality of metal cooling fins 13.

As before, discharge tube 10 enters upon and, therefore, intercouples the chambers formed by anode 14 and cathode 20, the discharge tube being mounted to the walls of the anode and cathode by means of metal tubular elements respectively designated 40 and 41. Element 40, as may be seen from FIG. 4, is bonded to both the wall of the anode and to the discharge tube so that the anode end of the discharge tube is rigidly fixed or held in position. On the other hand, in order to provide for the expansion and contraction of the discharge tube, element 41 is bonded only to the end of the discharge tube and is slidably mounted in the cathode wall. However, since a hermetic seal between the discharge tube and the cathode is required, an expansion joint in the form of a bellows 42 is therefore provided that closes off the space between element 41 and the cathode wall while at the same time permitting the element to move in and out through the wall. As may be seen from the figure and for the very same reasons, a bellows-type expansion joint 43 is provided for gas-return tube 24 whereat it couples to the cathode chamber, the other end of tube 24, like the discharge tube, being rigidly fixed in position on the anode wall.

With regard to metal tubes 24 and 36, it should finally be mentioned with respect to them that in order to prevent or minimize electrical current flow in them and resultant arcing, they are each preferably constructed in sections with highly insulative rings, such as insulative rings 24a and 36a, being mounted between these sections, the metal sections and insulative rings being suitably bonded to one another to provide the desired hermetic seal. It should also be mentioned that the remainder of the FIG. 4 laser structure is substantially the same as that previously described and, hence, no further description is deemed necessary at this point.

Considering the cooling cycle involved, when the laser is put into operation, the heat generated thereby in the discharge tube is absorbed by liquid 37 whose temperature then rises. As a result, some of the liquid is vaporized and this vapor 38 fills the space above the surface of the liquid. As is well known, heat is taken away from the body of liquid when the vapor is formed. This heat is then transferred by the vapor to cooling fins 13 which, in turn, transfers it to the surrounding air. However, in transferring heat to the fins, the vapor is cooled and, thereby, it condenses and goes back into solution. Thus, briefly stated, the liquid takes heat away from the discharge tube but in so doing partially vaporizes. This, in turn, draws heat away from the liquid. The heat is then transferred to the fins, as a consequence of which the vapor returns to its original liquid form. The described flow cycle, which continuously repeats itself, resembles the operation of a boiler and condenser combination and it is for this reason that member 36 and its contents were previously referred to as such.

Although a number of particular arrangements of the invention have been illustrated and described above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. An ionized gas laser structure comprising: an outer cylindrically shaped tube; a plurality of metal fins mounted on and spaced along the length of said outer tube and intimate contact with the surface thereof; a pair of hollow cylindrically shaped members respectively mounted on and enclosing the ends of said outer tube, each of said members having a pair of apertures therethrough within the space circumscribed by said outer tube, the apertures of one member facing and in registration with the apertures of the other member; a discharge tube mounted inside said outer tube between one pair of said apertures that are in registration with each other, whereby said discharge tube couples at opposite ends thereof with the chambers formed by said members; a pressure-equalizing tube mounted inside said outer tube between the other pair of said apertures that are in registration with each other, whereby said pressure-equalizing tube couples at opposite ends thereof with the chambers formed by said members, said pressure-equalizing tube being positioned above said discharge tube; a coolant fluid contained within said outer tube to a level that covers said discharge tube, said pressure-equalizing tube being above the level of said coolant fluid; a gas capable of lasing contained within said discharge and pressure-equalizing tubes and the hollows of said members; and electro-optical laser means respectively mounted in and on said members to produce a lasing action of said gas.

2. The structure defined in claim 1 wherein said structure further includes means mounted at one end of said discharge tube to permit said discharge tube to expand and contract in response to temperature variations and at the same time hermetically sealing said end of the discharge tube to its associated member.

3. The structure defined in claim 1 wherein said outer tube and said pressure-equalizing tube are each made of metal sections that are electrically insulated from one another.

* * * * *

UNITED STATES PATENT OFFICE
CERTIFICATE OF CORRECTION

Patent No. 3,753,144               Dated August 14, 1973

Inventor(s) William J. Kearns et al

It is certified that error appears in the above-identified patent and that said Letters Patent are hereby corrected as shown below:

In the heading of the printed patent, between lines 6 and 7 insert --[73] Assignee  Xerox Corporation
                                              Stamford, Conn.--.

Signed and sealed this 2nd day of April 1974.

(SEAL)
Attest:

EDWARD M. FLETCHER, JR.                C. MARSHALL DANN
Attesting Officer                      Commissioner of Patents